United States Patent
Miller

(10) Patent No.: US 9,788,138 B2
(45) Date of Patent: Oct. 10, 2017

(54) METHODS AND SYSTEMS OF ALLOCATING APPLICATION FUNCTIONS TO MOTION-CORRELATED DEVICES

(71) Applicant: QUALCOMM MEMS Technologies, Inc., San Diego, CA (US)

(72) Inventor: Brian Frederick Miller, San Diego, CA (US)

(73) Assignee: SnapTrack, Inc., San Diego, CA (US)

( * ) Notice: Subject to any disclaimer, the term of this patent is extended or adjusted under 35 U.S.C. 154(b) by 166 days.

(21) Appl. No.: 14/678,167

(22) Filed: Apr. 3, 2015

(65) Prior Publication Data

US 2016/0295010 A1 Oct. 6, 2016

(51) Int. Cl.
*H04W 4/00* (2009.01)
*H04M 1/725* (2006.01)

(52) U.S. Cl.
CPC ......... *H04W 4/005* (2013.01); *H04M 1/7253* (2013.01); *H04M 1/72569* (2013.01)

(58) Field of Classification Search
CPC ......... H04M 1/72597; H04M 1/72522; H04M 1/7253; H04M 1/725; H04M 1/0258; H04M 1/6058; H04M 1/72569; H04W 4/005; H04W 4/00; H04W 4/02; H04W 4/008; H04W 52/0254; H04W 4/027; H04W 88/02; H04W 4/003; H04W 92/18; H04W 28/0215

See application file for complete search history.

(56) References Cited

U.S. PATENT DOCUMENTS

| | | | | |
|---|---|---|---|---|
| 9,247,525 B2 * | 1/2016 | Jacobs | ............... | H04W 68/00 |
| 2010/0180336 A1 | 7/2010 | Jones et al. | | |
| 2010/0190513 A1 * | 7/2010 | Andreasson | ...... | G06F 17/30241 |
| | | | | 455/456.3 |
| 2014/0089673 A1 | 3/2014 | Luna | | |
| 2014/0293755 A1 * | 10/2014 | Geiser | ............. | G04B 19/24 |
| | | | | 368/12 |
| 2014/0298353 A1 * | 10/2014 | Hsu | ............. | G06F 9/54 |
| | | | | 719/313 |
| 2015/0031348 A1 * | 1/2015 | Lee | ............. | H04B 1/385 |
| | | | | 455/418 |
| 2015/0281945 A1 * | 10/2015 | Seo | ............. | H04M 1/271 |
| | | | | 455/419 |
| 2015/0296480 A1 * | 10/2015 | Kinsey | ............. | H04M 19/047 |
| | | | | 455/41.3 |
| 2016/0036953 A1 * | 2/2016 | Lee | ............. | H04M 1/576 |
| | | | | 455/426.1 |

(Continued)

FOREIGN PATENT DOCUMENTS

| | | |
|---|---|---|
| WO | 2013093638 A2 | 6/2013 |
| WO | 2013096954 A1 | 6/2013 |
| WO | 2014165230 A1 | 10/2014 |

*Primary Examiner* — Meless Zewdu
(74) *Attorney, Agent, or Firm* — Knobbe, Martens, Olson & Bear, LLP

(57) ABSTRACT

Embodiments include systems and methods of allocating application functions to motion-correlated devices. A processor may determine whether a first motion of a first mobile device and a second motion of a second mobile device are correlated. The processor may allocate a first application function to the first mobile device and a second application function to the second mobile device in response to determining that the first motion and the second motion are correlated.

16 Claims, 6 Drawing Sheets

(56) References Cited

U.S. PATENT DOCUMENTS

| | | | |
|---|---|---|---|
| 2016/0066124 A1* | 3/2016 | Chang | G06Q 30/0269 455/41.2 |
| 2016/0070900 A1* | 3/2016 | Kim | G06F 21/34 726/3 |
| 2016/0198322 A1* | 7/2016 | Pitis | H04W 4/008 455/420 |

* cited by examiner

METHODS AND SYSTEMS OF ALLOCATING APPLICATION FUNCTIONS TO MOTION-CORRELATED DEVICES

BACKGROUND

Wireless devices that communicate using short-range communication are increasingly become standard apparel and must-have devices. In particular, the use of two or more wireless devices that interact with each other is rapidly expanding. For example, a user may have both a smartphone and a wearable electronic device, such as a smart watch or similar device, each configured to communicate with each other. Increasing demands are being placed on the capabilities and usability of portable electronic devices, in particular portable electronic devices that interact with each other. Thus, the functionality requirements and the complexity of such machine-to-machine interactions continue to spawn technical and design challenges.

SUMMARY

Systems, methods, and devices of various embodiments enable allocating application functions to two or more mobile devices based on the degree to which motions of the devices are correlated. Various embodiments may include determining whether a first motion of a first mobile device and a second motion of a second mobile device are correlated and allocating a first application function to the first mobile device and a second application function to the second mobile device in response to determining that the first motion and the second motion are correlated. In some embodiments, allocating a first application function to the first mobile device and a second application function to the second mobile device in response to determining that the first motion and the second motion are correlated may include allocating the first application function and the second application function of an application running on one of the first and second mobile devices in response to determining that the first motion and the second motion are correlated. In some embodiments, allocating a first application function to the first mobile device and a second application function to the second mobile device in response to determining that the first motion and the second motion are correlated may include allocating the first application function and the second application function of an application launched on one of the first and second mobile devices after determining that the first motion and the second motion are correlated.

In some embodiments, at least one of the first application function and the second application function may be a latent application function. In some embodiments, determining whether the first motion of the first mobile device and the second motion of the second mobile device are correlated may include determining whether the first motion and the second motion are correlated within a correlation threshold.

In some embodiments, determining whether the first motion of the first mobile device and the second motion of the second mobile device are correlated may include determining whether the first motion and the second motion are correlated within one of two or more correlation tiers. In some embodiments, determining whether the first motion and the second motion are correlated within one of two or more correlation tiers may include comparing the correlated first and second motions to two or more thresholds, and identifying a correlation tier based on the comparison of the correlated first and second motions to the two or more thresholds. In such embodiments, allocating the first application function to the first mobile device and the second application function to the second mobile device in response to determining that the first motion and the second motion are correlated may include allocating the first application function and the second application function based on the identified correlation tier. In such embodiments, allocating at least one application function to at least one of the first mobile device held in the hand of the user or the second mobile device worn on the wrist of the user may include allocating a first application function to the first mobile device held in the hand of the user and a second application function to the second mobile device worn on the wrist of the user in response to determining based on a degree of correlation between the first motion and the second motion that the first mobile device is being held in the user's hand connected to the wrist on which the second mobile device is being worn.

Some embodiments may further include determining whether the first motion of the first mobile device and the second motion of the wearable device are no longer correlated, and performing one or more of allocating both of the first and second application functions to one of the mobile communication device and the wearable device, terminating at least one of the first application function and the second application function, and launching an application on one or more of the first mobile device and the second mobile device in response to determining that the first motion and the second motion are no longer correlated. In some embodiments, the first mobile device may include a mobile communication device and the second mobile device may include a wearable device, which may include a smartwatch.

Various embodiments may further allocating application functions among a first mobile device configured to be held in a hand of a user and a second mobile device configured to be worn on a wrist of the user by determining whether a first motion of the first mobile device held in a hand of a user and a second motion of the second mobile device worn on a wrist of the user are correlated, and allocating at least one application function to at least one of the first mobile device or the second mobile device in response to determining that the first motion of the first mobile device held in a hand of a user and the second motion of the second mobile device worn on a wrist of the user are correlated. In some embodiments, allocating at least one application function to at least one of the first mobile device or the second mobile device may include allocating a first application function to the first mobile device held in a hand of a user and a second application function to the second mobile device worn on a wrist of the user.

Various embodiments may include a mobile device including a processor configured with processor-executable instructions to perform operations of the embodiment methods described above. Various embodiments may include a non-transitory processor-readable storage medium having stored thereon processor-executable software instructions configured to cause a processor to perform operations of the embodiment methods described above. Various embodiments may include a mobile device that includes means for performing functions of the operations of the embodiment methods described above

BRIEF DESCRIPTION OF THE DRAWINGS

The accompanying drawings, which are incorporated herein and constitute part of this specification, illustrate exemplary aspects of the invention. Together with the gen

DETAILED DESCRIPTION

Figure 1:
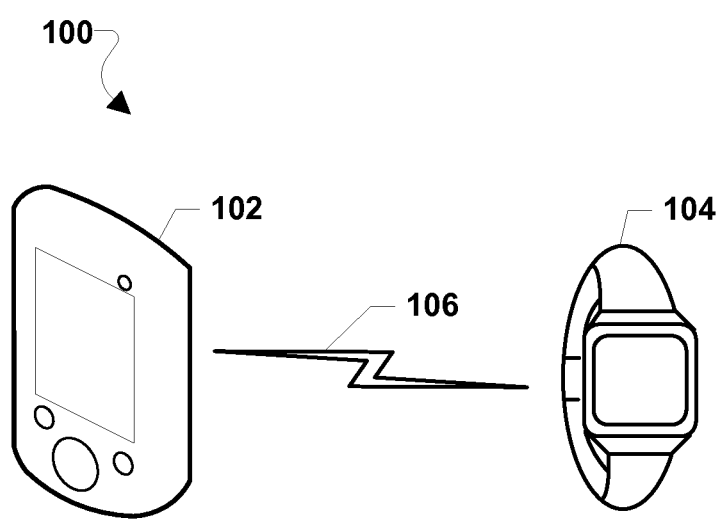
- FIG. 1 is a system diagram illustrating components suitable for use in various embodiments.

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the various aspects or the claims.

The various embodiments enable the automatic allocation of functions and displays among two or more mobile devices based on whether motions of the devices are correlated. Correlating the motions of two or more mobile devices may enable one or both of the mobile devices to determine whether the devices are being used together, held in the same hand, on the same person but located on different parts of the person's body, etc. Based on where and how the two or more mobile devices are positioned on the person's body, a function and/or display may be selected for each device to improve the user experience.

The terms "communication device," "mobile device," "mobile communication device, " and "mobile communication wireless device" are used interchangeably herein to refer to any one or all of cellular telephones, smartphones, personal or mobile multi-media players, personal data assistants (PDAs), laptop computers, tablet computers, smartbooks, palmtop computers, wireless electronic mail receivers, multimedia Internet enabled cellular telephones, wireless gaming controllers, and similar electronic devices which include a programmable processor and a memory.

The term "wearable device" is used herein to refer to any one or all of smart watches, wearable computers (e.g., computing devices in the form of a badge, tag, bracelet, patch, belt buckle, medallion, pen, key chain, or any other device worn or carried by a user), cellular telephones, smart phones, personal or mobile multi-media players, personal data assistants (PDAs), wireless electronic mail receivers, multimedia Internet enabled cellular telephones, wireless gaming controllers, smart clothing, and similar personal electronic devices that include one or more programmable processor, memory, and an input component for receiving user input.

As used in this application, the terms "component," "system," and the like are intended to include a computer-related entity, such as, but not limited to, hardware, firmware, a combination of hardware and software, software, or software in execution, which are configured to perform particular operations or functions. For example, a component may be, but is not limited to, a process running on a processor, a processor, an object, an executable, a thread of execution, a program, and/or a computer. By way of illustration, both an application running on a wireless device and the wireless device itself may be referred to as a component. One or more components may reside within a process and/or thread of execution and a component may be localized on one processor or core and/or distributed between two or more processors or cores. In addition, these components may execute from various non-transitory computer readable media having various instructions and/or data structures stored thereon. Components may communicate by way of local and/or remote processes, function or procedure calls, electronic signals, data packets, memory read/writes, and other known computer, processor, and/or process related communication methodologies.

The various embodiments include methods, and devices such as mobile communication devices and wearable devices configured to implement the methods, of allocating application functions (including displays and/or graphical user interfaces) among a mobile communication device and a wearable device when motions of the two devices are correlated. Correlation of device motions may provide an indication whether both devices are in possession of one user, in use by the user simultaneous, and identify the device that is most visible or accessible to the user.

When the motions of the two devices are correlated, a processor of the mobile communication device and/or the wearable device may allocate functions and/or displays of an application among the two devices, such as allocating a first application function to the mobile communication device and a second application function to the wearable device. As an example, the processor may allocate a time-of-day display function to the wearable device, and may allocate a music playback control function to the mobile communication device, which may include enabling controls on a touchscreen and/or physical buttons, and controlling functions of a music playback application based on inputs to the controls.

The processor may also allocate functions of an application that is running on both the mobile communication device and the wearable device in response to determining that the motions of both devices are correlated. As an example, a fitness application may include a heart rate display and a daily activity graph display (e.g., showing types and levels of daily fitness activity). The processor may allocate the display of current heart rate to the wearable device, and may allocate the display of a daily activity graph to the mobile communication device.

The processor may also allocate functions of an application that is launched in response to the processor determining that the motions of both devices have become correlated. As an example, the processor may allocate to the mobile communication device a display of a battery level of the wearable device in response to determining that the motions of both devices have become correlated. As another example, the processor may allocate to the mobile communication device a function of checking for available software, firmware, or other updates to the mobile communication device in response to the processor determining that the motions of both devices have become correlated.

The processor may also allocate functions of an application that is launched at some point after the processor determines that the motions of both devices are correlated. In some embodiments, the processor may also allocate a function of an application that is latent (e.g., a dormant or inaccessible application function, or an application function that is not running) in response to the processor determining that the motions of both devices are correlated. Examples of functions that may be allocated to one device or the other include information displays (e.g., time, video, name of a media file that is playing, etc.), graphical user interfaces (e.g., setting the device with which the user interacts with an application), user notifications (e.g., sounds, vibrations, and displays of alerts), communication interfaces (e.g., speaker and microphone used for voice calls), and execution of applications.

In some embodiments, the processor may determine whether the motion of the mobile communication device and the motion of the wearable device are correlated within a correlation threshold. The processor may also determine whether the motions of the mobile communication device and the wearable device are correlated within two or more correlation tiers. For example, the motions of the two devices may be tightly correlated within a first tier (i.e., within a first threshold), which may indicate very close proximity of the two devices. As an example, the two mobile devices may be worn on (or near) or held by the same appendage, such as when the user is holding a mobile communication device in his/her hand while wearing a smartwatch. The motions of the two devices may also be moderately correlated within a second tier (i.e., between the first threshold and a second threshold), which may indicate moderate proximity of the two devices. For example, the two devices may be used in or worn on different appendages. The motions of the two devices may also be loosely correlated within a third tier (i.e., between the second threshold and a third threshold), which may indicate a lower level of motion correlation of the two devices. For example, one device may be used in the hand or worn on the wrist, and the other device may be in a pocket, a bag, or a holster. The processor may allocate the first and second application functions according to the determined correlation tier.

Allocating application functions based on the degree to which motions of the two devices are correlated may provide various advantages. For example, functions may be allocated to take advantage of a display size of one device, such as between the relatively small display of a smartwatch and the relatively large display of a smartphone. Functions may be allocated to extend the display of various application functionality across more than one device. Allocating application functions based on motion correlation may also provide power savings for one or more of the devices as the functions may be allocated more efficiently. For example, one or the other processor may shut down or disable power draining application functions, such as display, vibration, or audible alert functions of one device that is less available to the user (e.g., in a pocket) than the other device (e.g., on the user's wrist).

FIG. 1 illustrates a system 100 suitable for use in various embodiments including a mobile communication device 102 and a wearable device 104. Each of the mobile communication device and the wearable device may be configured to wirelessly communicate via a short-range communication link 106. Each of the mobile communication device and the wearable device may include a memory or similar non-transitory computer-readable or processor-readable media, and a processor for executing code and/or instructions that may be stored in the memory. The wearable device may be relatively small such that the wearable device may be worn on a user's body (for instance, a wrist-worn display device such as a smart watch), may be integrated into the user's clothing, or may be attached to the outside of a user's clothing. Due to its relatively small size, the wearable device may include a relatively small display device (if any), and may include a relatively limited input device. For example, the wearable device may be configured with a relatively small touchscreen and or a relatively small number of buttons or other physical input devices. The mobile communication device may include a comparatively large display relative to a display of the wearable device, and may include comparatively more robust input devices, such as a larger touchscreen, a greater number and/or diversity physical input devices, and other such input devices. Each of the mobile communication device and the wearable device may also include a radio signal transceiver and an antenna for sending and receiving communications, to enable the two devices to communicate wirelessly. The two devices may communicate with each other using any appropriate communication protocol.

Figure 2:
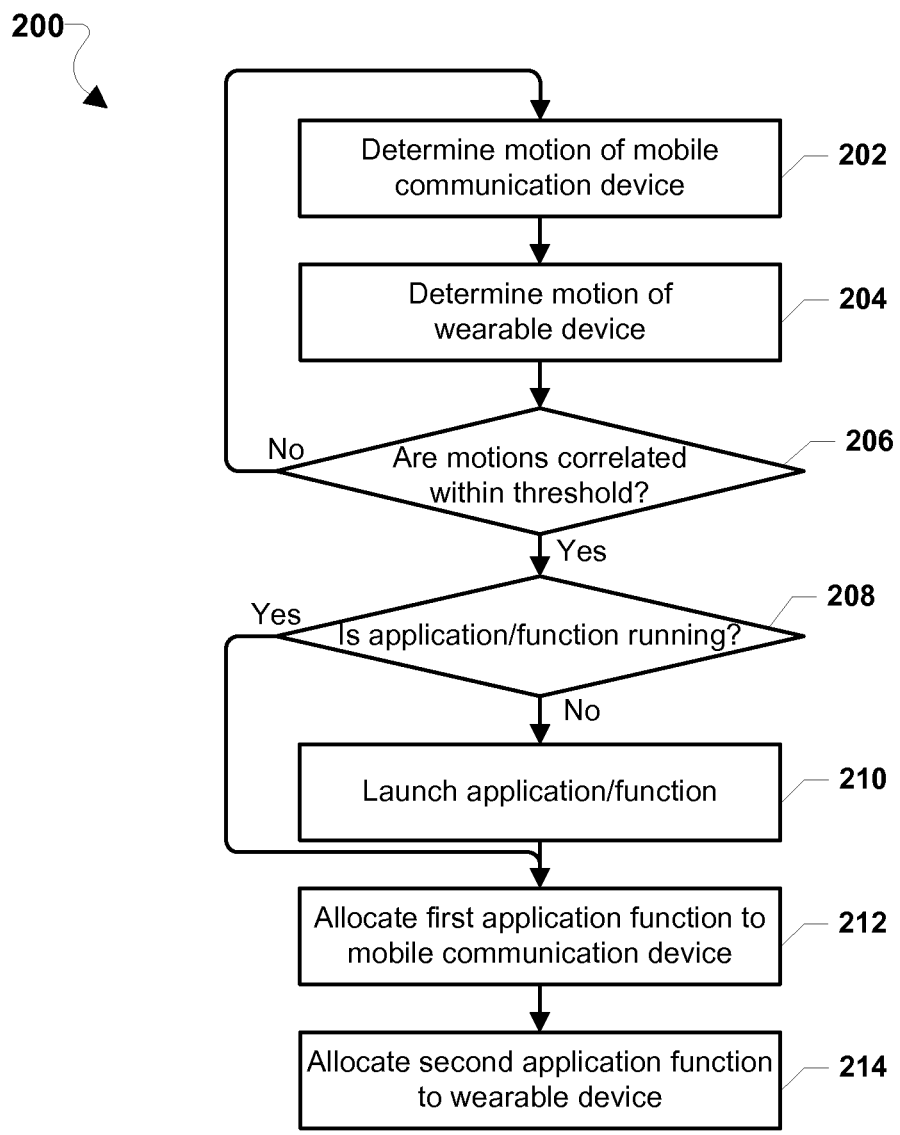
FIG. 2 is a process flow diagram illustrating a method for allocating application functions to motion-correlated devices according to various embodiments.

FIG. 2 illustrates a method 200 for allocating application functions to motion-correlated devices (e.g., the mobile communication device 102 and the wearable device 104 in FIG. 1) according to some embodiments. The method 200 may be implemented by a processor (e.g., a processor of the mobile communication device 102 and/or a processor of the wearable device 104).

In block 202, the processor may determine a motion of a mobile communication device (e.g., the mobile communication device 102), and in block 204 the processor may determine a motion of a wearable device (e.g., the wearable device 104). The processor may determine the motions of the devices using inputs from one or more motion sensors of each device, such as an accelerometer, a gyroscope, a gravitometer, or another appropriate motion sensor.

In determination block 206, the processor may determine whether the motions of the mobile communication device and the wearable device are correlated within a correlation threshold. This correlation determination may be accomplished by comparing the motion data (e.g., accelerations) received from each device over time to determine differences, recognize synchronized movements, and using statistical analyses to determine the degree to which the motion data from each device have similarities in magnitude, timing, frequency, etc. The correlation threshold may be set to enable the processor to recognize when the level of correlation indicates that the two devices are in the possession of a single user. The correlation threshold may also be set at a level that enables the processor to determine that the two devices are in simultaneous use by a user. In response to determining that the motions of the mobile communication device and the wearable device are not correlated within the threshold (i.e., determination block 206="No"), the processor may periodically repeat the operations of determining the motions of the mobile communication device and the wearable device in blocks 202 and 204 and determining whether the device motions are correlated within the correlation threshold.

In response to determining that the motions of the mobile communication device and the wearable device are correlated within the threshold (i.e., determination block 206="Yes"), the processor may determine whether an application or an application function is running in determination block 208. In response to determining that the application or application function is not running (i.e., determination block 208="No"), the processor may launch the application or application function in block 210.

In response to determining that the application or application function is running (i.e., determination block 208="Yes") or upon launching the application in block 210, the processor may allocate a first application function to the mobile communication device block 212, and/or may allocate a second application function to the wearable device in block 214. In some embodiments, the processor may allocate functions of an application that is running on one of the mobile communication device and the wearable device in response to determining that the motions of both devices are correlated. In some embodiments, the processor may also allocate functions of an application that is launched at some point after the processor determines that the motions of both devices are correlated.

The first and second application functions may include functions of an operating system-level application of the mobile communication device and/or the wearable device, including visual outputs (e.g., displays), audio outputs, user interfaces, etc. For example, in response to determining that the motions of the mobile communication device and the wearable device are correlated within the threshold, the processor may allocate a time display function to the wearable device, and allocate a calendar function to the mobile communication device so that a visually complex calendar is displayed by the mobile communication device.

The processor may allocate application functions to enable screen sharing, screen extending, or desktop extending across displays of the mobile communication device and the wearable device. For example, the processor may extend a spreadsheet or a document across displays of the mobile communication device and the wearable device by allocating display functions to each of the devices. The processor may also allocate different functions of an application to each device. For example, the processor may allocate a first display function of a gaming application to the mobile communication device, and allocate a second display function of the gaming application to the wearable device to show a different view or an extended-display view of a game or game feature. As another example, the processor may allocate a larger display function of a map application or GPS application to the mobile communication device, and allocate a smaller display function (e.g., the current GPS coordinates of the wearer) to the wearable device.

The first and second application functions may also include notifications, alerts (which may be visual, audible, vibration, or another alert), or other signals intended for a user, and the processor may allocate one or more notification functions to one of the devices. For example, in response to determining that the motions of the mobile communication device and the wearable device are correlated within the threshold, the processor may allocate incoming call notifications to the wearable device and allocate a display of call information or contact information to the mobile communication device. Allocating notification functions to one device may serve to save power on the other device. In some embodiments, allocating notification functions to one device may enable the other device to enter a low-power mode or idle mode, or otherwise reduce power consumption by the other device. Reducing power consumption by one of the devices may include disconnecting or degrading radios or other wireless communication link capabilities, including reducing power of or otherwise degrading the wireless communication link between the mobile communication device and the wearable device.

As another example, the processor may hand over application functionality from one device to the other device. For example, the processor may allocate music playback functions of a media player application to the wearable device. As another example, the processor may allocate control functions of a media player application to the wearable device (e.g., play, pause, stop, fast-forward, rewind, and similar functions), and the processor may allocate a display function of an album cover, recording information, artist information, and similar information to the mobile communication device. As another example, the processor may move a display function of an ongoing video playback from the wearable device to the mobile communication device. As another example, the processor may allocate a first display function of a gaming application to the mobile communication device, and may allocate control input functions for the gaming application to the wearable device (e.g., to enable a user to control aspects of the game using the wearable device).

The processor may also allocate functions to each device to divide or split functionality of an application. For example, the processor may allocate a display function of a note taking, messaging, or email application to the mobile communication device, and allocate a microphone or a voice recognition function of the note taking, messaging, or email application to the wearable device.

In some embodiments, the processor may allocate one or more latent application functions to the mobile communication device. For example, an application running on one device may include a function that is not active, accessible, or available on the one device (e.g., the application function is latent). In response to determining that the motions of the devices are correlated within the threshold, the processor may launch, activate, or wake up a latent function of the application, and the processor may allocate that function to one of the mobile communication device and the wearable device. In so doing, the processor may launch a new application function, or may make available a previously dormant application function. The processor may thus allocate, re-allocate, move, hand over, or redistribute different application functions to each of the mobile communication device and the wearable device.

For example, a fitness or exercise application may be running on the wearable device. In response to determining that the devices are motion-correlated, the processor may allocate a display of certain application features (e.g., a heart rate) to the wearable device, and the processor may allocate to the mobile communication device functions such as displaying historical data, exercise instructional videos, and other similar functions that may be unavailable through the wearable device. As another example, the processor may wake up or launch functions of a gaming application running on the mobile communication device, such as a second-screen display function, and allocate the second-screen display function to the wearable device.

The processor may also synchronize device states and/or application data of the mobile communication device and the wearable device in response to determining that the motions of the mobile communication device and the wearable device are correlated within the threshold. For example, the processor may update a fitness application on the mobile communication device with data tracked by a fitness application running on the wearable device. As another example, the processor may update a note taking application on one device with a sound recording or note data received at the other device. Other application data, such as contact information, gaming scores and game states, calendar data, GPS tracking data, fitness data, consumable media bookmark data, and other application data may be similarly synchronized across motion-correlated devices.

Figure 3:
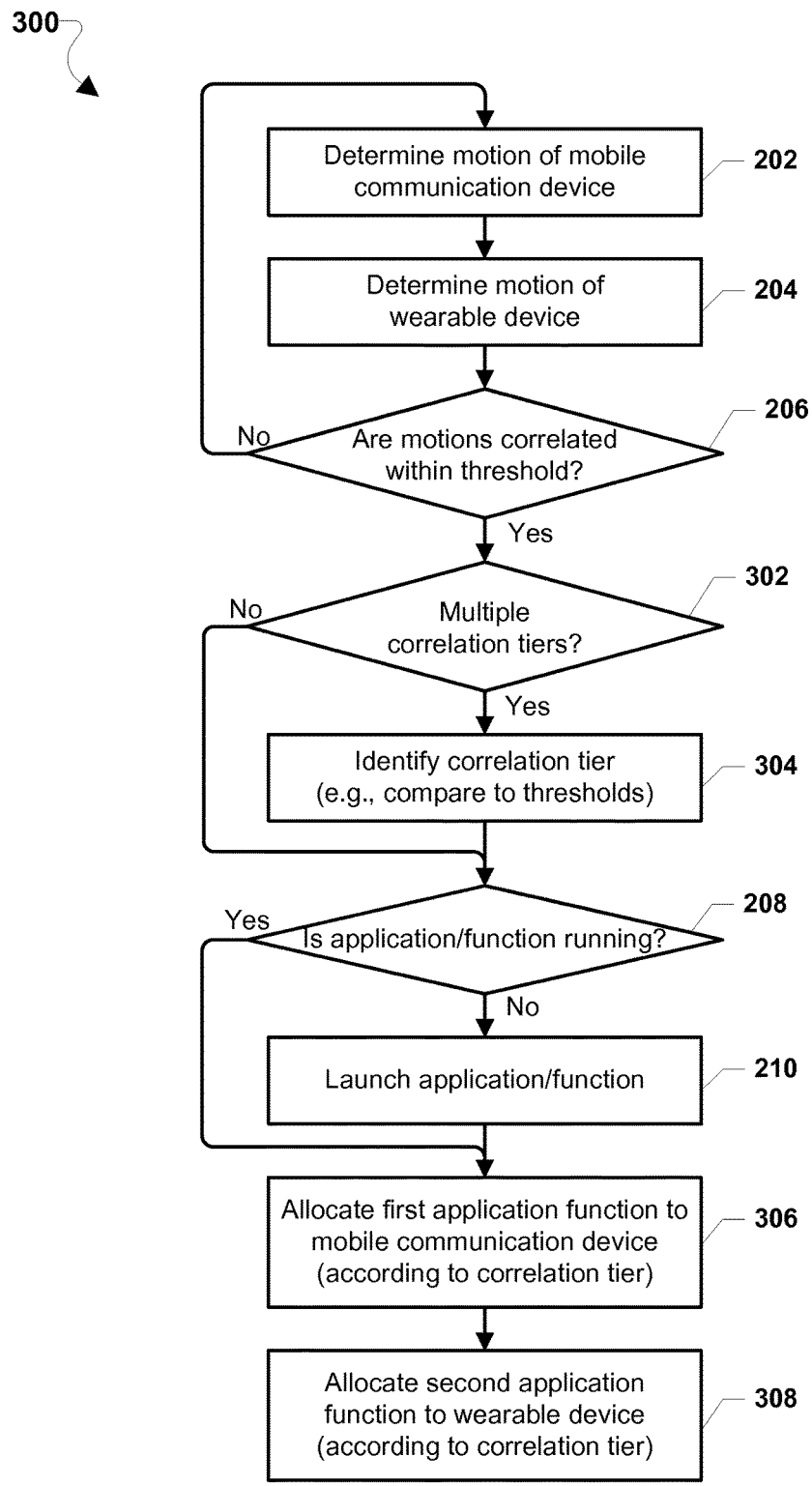
FIG. 3 is another process flow diagram illustrating a method for allocating application functions to motion-correlated devices according to various embodiments.

FIG. 3 illustrates a method 300 for allocating application functions to motion-correlated devices (e.g., the mobile communication device 102 and the wearable device 104 in FIG. 1) according to some embodiments. The method 300 may be implemented by a processor (e.g., a processor of the mobile communication device 102 and/or a processor of the wearable device 104).

The operations of blocks 202 and 204, and determination block 206 may be similar to the operations of block 202-206 in the method 200 described above. In response to determining that the motions of the mobile communication device and the wearable device are correlated within the threshold (i.e., determination block 206="Yes"), the processor may determine whether the processor is configured to determine the motions of the two devices are correlated within two or more correlation tiers in determination block 302.

In response to determining that the processor is configured to identify the correlation of the motions of the two devices within two or more correlation tiers (i.e., determination block 302="Yes"), the processor may determine the correlation tier in which the correlated motion of the two devices falls in block 304. For example, the motions of the two devices may be tightly correlated within a first tier (i.e., within a first threshold), which may indicate very close proximity of the two devices, such as when the two devices are being worn on (or near) and held by the same appendage (e.g., a smartwatch worn on a wrist connected to a hand holding a mobile phone). Thus, in the case of a first device configured to be handheld and a second device configured to be worn on the wrist, a processor may determined that the first device is being held in the hand connected to the wrist on which the second device is being worn when the motions of the two devices are tightly correlated. The motions of the two devices may also be moderately correlated within a second tier (i.e., between the first threshold and a second threshold), which may indicate moderate proximity of the two devices. For example, the two devices may be used in or worn on different appendages. The motions of the two devices may also be loosely correlated within a third tier (i.e., between the second threshold and a third threshold), which may indicate a lower level of motion correlation of the two devices. For example, one device may be used in hand or worn on the wrist, and the other device may be in a pocket, a bag, or a holster.

In some embodiments, the processor may compare the correlated motion of the two devices to two or more correlation tier thresholds. For example, the processor may determine that the correlated motion of the two devices is below a first threshold, or is between the first threshold and a second threshold. Additionally or alternatively, the processor may determine that the correlated motion of the two devices is between a second threshold and a third threshold. In various embodiments, the processor may be configured to use two, three, or more thresholds, depending at least in part on an level of granularity at which the motion correlation may be analyzed.

The processor may allocate the first and/or second application functions according to the determined correlation tier. For example, if the correlated motion of the two devices falls into a first tier (i.e., the two devices are in very close proximity, such as one device is in the user's hand connected to the wrist on which the other device is being worn), the processor may only allocate certain application functions, and may not allocate certain application functions, to each device. For example, if the correlated motions of the two devices are tightly correlated and fall into the first tier such that the processor determines that both devices may be held in or worn on the same appendage (e.g., a smart watch on a user's left wrist and a smartphone in the user's left hand), the processor may not allocate certain display functions, or certain application control functions, or other similarly unusable application functions, to the wearable device. This is because certain device functions may not be readily usable when the two devices are positioned on the same arm. For example, a smart watch display may be pointed away from a user's face while the user is interfacing with a smartphone held in the hand connected to wrist on which the smart watch is being worn. Thus, when the correlated motion of the two devices falls into the first tier, the processor may allocate display functions taking into account the anatomical relationship between the top of the wrist on which one device is positioned and the palm of the hand in which the other device is being held. On the other hand, the processor may allocate certain notification functions (e.g., audible or vibration alerts) to the wearable device, for example, since the orientation of the display may not affect the usability of such application functions.

As another example, if the correlated motion of the two devices falls into a second tier (e.g. the correlated motion of the two devices is between the first threshold and a second threshold) the moderate level of motion correlation may indicate that, for example, the two devices may be used in or worn on different appendages (e.g. a left wrist and a right hand). The processor may allocate certain application functions accordingly, since, for example, the displays and input devices of both devices may be readily usable.

As another example, if the correlated motion of the two devices falls into a third tier (e.g. the correlated motion of the two devices is between the second threshold and a third threshold) the relatively loose or low level of motion correlation may indicate that, for example, one of the two devices may be in a pocket, in a bag, in a holster, or similarly less conveniently located. The processor may further determine which of the two devices has the lower degree of motion, and the processor may allocate, or not allocate, certain application functions accordingly. For example, the display and input devices of a device in a bag may be relatively inaccessible, and further, audio, visual, and vibration notifications may not attract the user's attention. Thus, the processor may not allocate display functions, control functions, notification functions, or other similar functions that may be relatively unusable or inaccessible to the device with the lower degree (or amount) of motion. Thus, the processor may parse application functions into tiers, and the processor may use a different levels or tiers of motion correlation, and the processor may allocate application functions according to the determined correlation tier.

In some embodiments, the processor may also use orientation information from each of the two devices in addition to the motion correlation. For example processor may receive accelerometer data from each of the mobile communication device and the wearable device, and the processor may compare the accelerometer data and may use the comparison of the accelerometer data from each of the two devices to determine whether to allocate application functions, and which application functions to allocate, to each of the mobile communication device and the wearable device. For example, the processor may determine that the polarity of the accelerometer data is in phase, which may indicate that both devices are oriented in the same general direction (e.g., facing a user). As another example, the processor may determine that the polarity of the accelerometer data is out of phase, which may indicate that each device is oriented in a different direction (e.g., one devices facing the user, and another devices facing away from the user). The processor may use accelerometer data in combination with the motion correlation to determine whether to allocate application functions, and to which device. For example, if the mobile communication device is determined to be facing upwards, and the polarity of the accelerometer data on the wearable device is out of phase with that of the mobile communication device, then the display of the wearable device may be determined to be facing away from the wearer. In this case, the display of the wearable device may be blanked and only the display of the mobile communication device may be used to display application information.

Following the operations of block 304 or in response to determining that the processor is not configured to determine the correlation of the motions of the two devices within two or more correlation tiers (i.e., determination block 302 ="No"), the processor may determine whether an application or application function is already running in determination block 208. In response to determining that the application or application function is not running (i.e., determination block 208 ="No"), the processor may launch the application or application function in block 210.

After launching an application or function or in response to determining that the application or application function is running (i.e., determination block 208="Yes"), the processor may allocate a first application function to the mobile communication device, which the processor may allocate according to a determined correlation tier block 306. In block 308 the processor may or may not allocate a second application function to the wearable device, which the processor may allocate according to the determined correlation tier.

Figure 4:
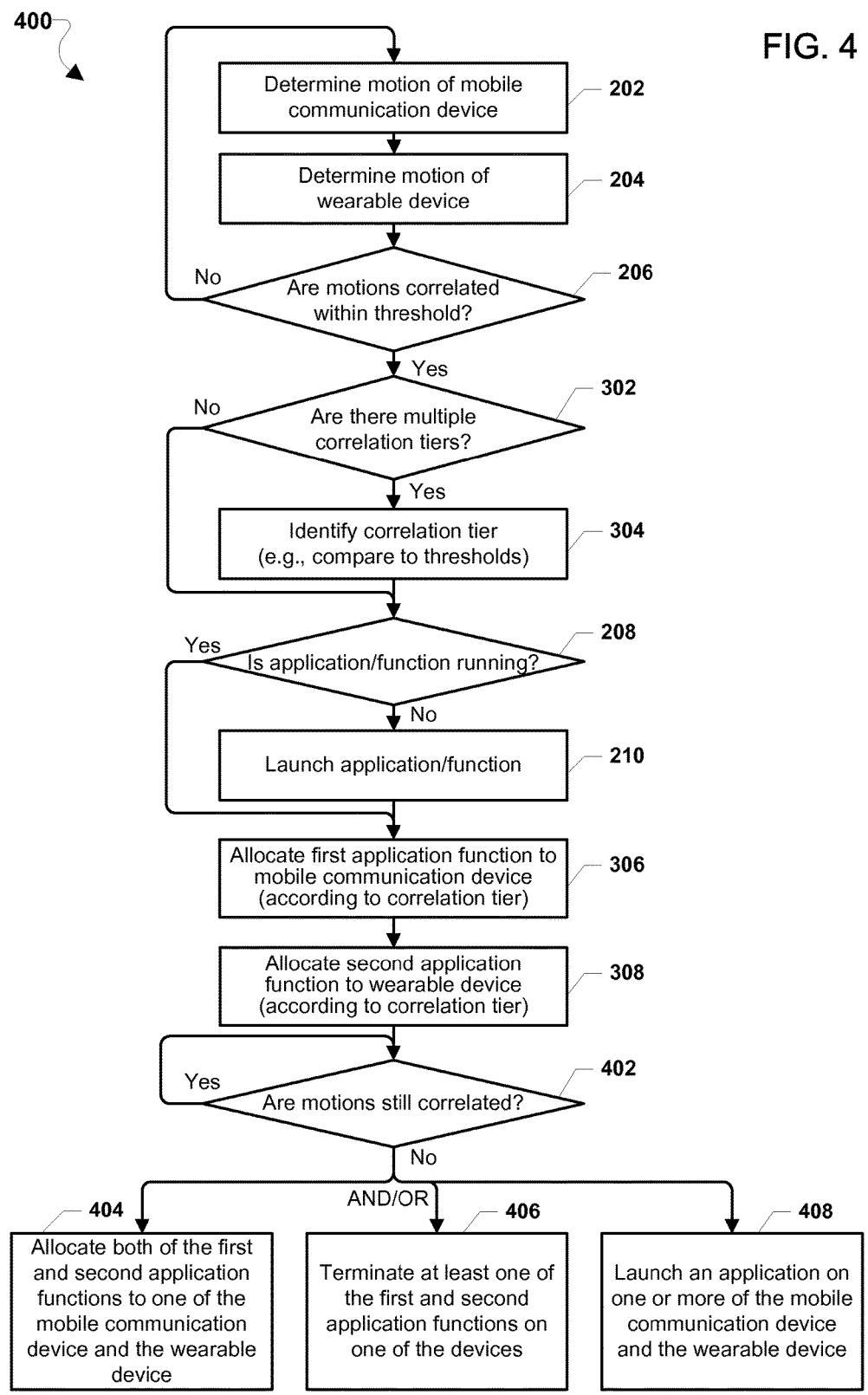
FIG. 4 is another process flow diagram illustrating a method for allocating application functions to motion-correlated devices according to various embodiments.

FIG. 4 illustrates a method 400 for allocating application functions to motion-correlated devices (e.g., the mobile communication device 102 and the wearable device 104 in FIG. 1) according to some embodiments. The method 400 may be implemented by a processor (e.g., a processor of the mobile communication device 102 and/or a processor of the wearable device 104).

The operations of blocks 202-308 may be similar to the operations of block 202-308 in the methods 200 and 300 described above. In determination block 402, the processor may determine whether the motions of the two devices are still correlated. For example, a device may be powered off and may no longer provide motion data to the processor. As another example, the device may be left behind or otherwise may move out of communication range of the other device, such that the correlation of the motions of the mobile communication device and the wearable device drops below a threshold. In response to determining that the motions of the two devices are still correlated (i.e., determination block 402 ="Yes"), the processor may retain the allocation of the first and second application functions, and may periodically redetermine whether the motions are still correlated.

In response to determining that the motions of the two devices are not still correlated (i.e., determination block 402="No"), the processor may allocate both of the first and second application functions to one of the mobile communication device and the wearable device in block 404. For example, the processor may allocate all notification functions, application control functions, call control functions, or other similar application functions to one of the two devices. For example, when a device no longer provides motion data, the processor may allocate all application functions to the device that is still in motion, or is an substantially greater motion.

Additionally or alternatively, in response to determining that the motions of the two devices are not still correlated (i.e., determination block 402="No"), the processor may terminate at least one of the first and second application functions in block 406. For example, when one of the allocated application functions was previously a latent or dormant application function, the processor may terminate the allocated application function.

Additionally or alternatively, in response to determining that the motions of the two devices are not still correlated (i.e., determination block 402="No"), the processor may launch an application function on one or more of the first mobile device and the second mobile device in block 408. For example, the processor may activate a tracking application on one or both devices. As another example, the processor may activate an audible alarm application on one or both devices, which may trigger an alert on one or more of the devices, such as a visual, audible, vibration, or some other alert, which may include combinations thereof.

Figure 5:
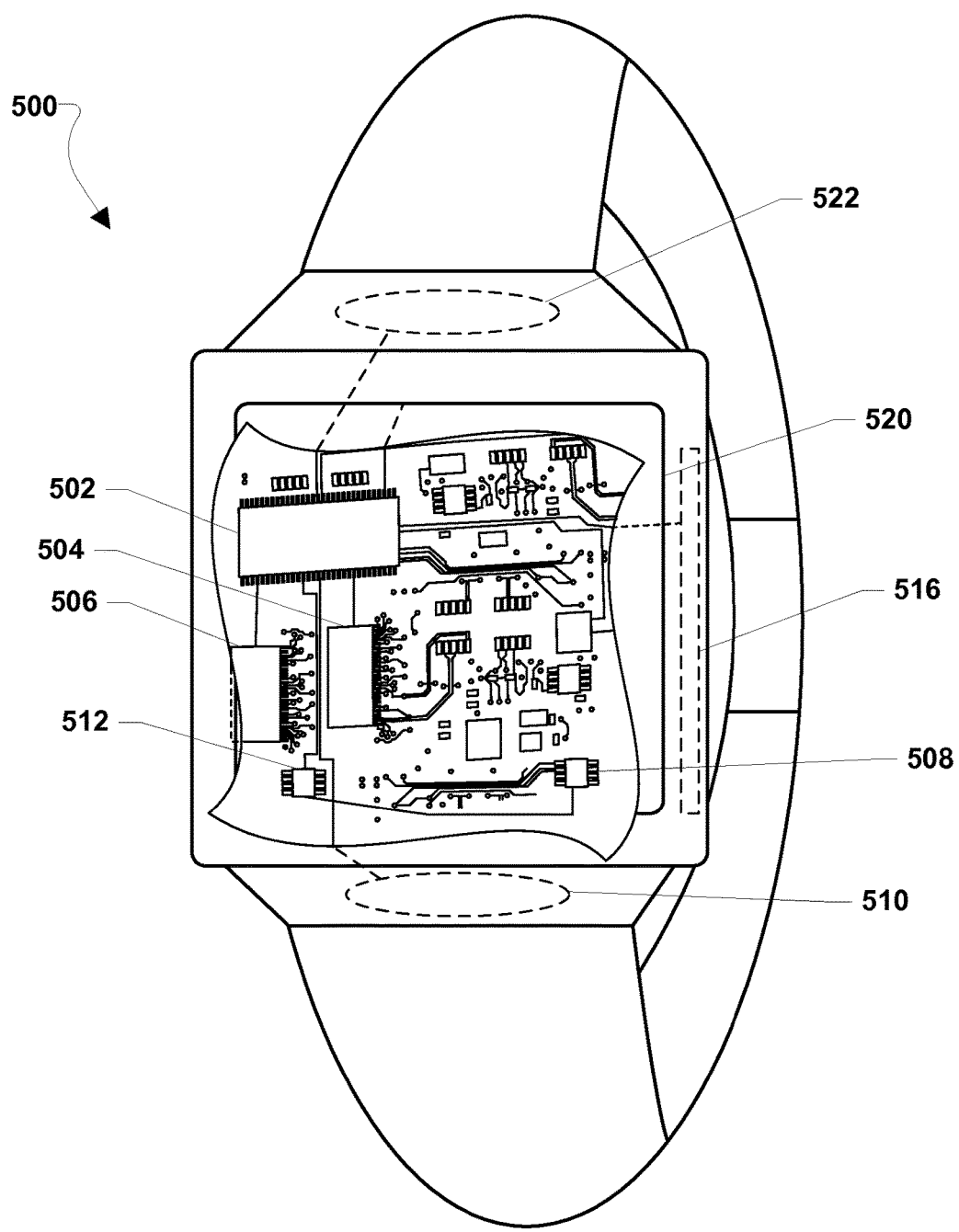
FIG. 5 is a component block diagram of a wearable device suitable for use in various embodiments.
Figure 6:
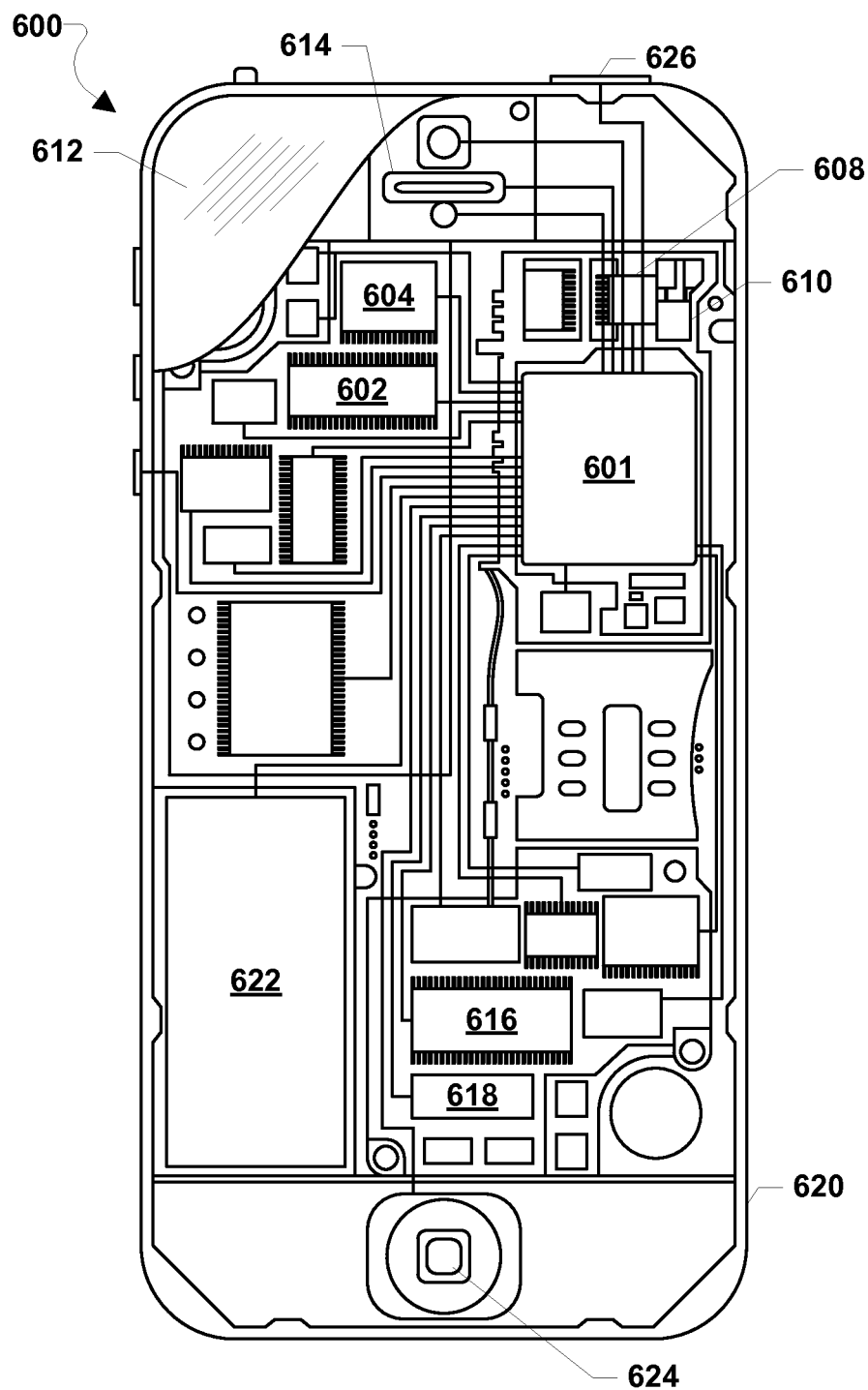
FIG. 6 is a component block diagram of a mobile communication device suitable for use in various embodiments.

Various embodiments may be implemented in any of a variety of mobile communication wireless devices, examples of which (e.g., a smart watch 500 and a mobile communication wireless device 600) are illustrated in FIGS. 5 and 6. In various embodiments, the smart watch 500 and the mobile communication wireless device 600 be similar to the mobile communication device 102 and the wearable device 104 as described with reference to FIG. 1. As such, the smart watch 500 and the mobile communication wireless device 600 may implement the methods 300, 400, and 500 of FIGS. 3-5.

The smart watch 500 may include a processor 502 coupled to internal memories 504 and 506. Internal memories 504 and 506 may be volatile or non-volatile memories, and may also be secure and/or encrypted memories, or unsecure and/or unencrypted memories, or any combination thereof. The processor 502 may also be coupled to a touchscreen display 520, such as a resistive-sensing touchscreen, capacitive-sensing touchscreen infrared sensing touchscreen, or the like. Additionally, the smart watch 500 may have one or more antenna 508 for sending and receiving electromagnetic radiation that may be connected to one or more wireless data links 512, such as one or more Bluetooth® transceivers, Peanut transceivers, Wi-Fi transceivers, ANT+ transceivers, etc., which may be coupled to the processor 502. The smart watch 500 may also include physical virtual buttons 522 and 510 for receiving user inputs as well as a slide sensor 516 for receiving user inputs.

The processor 502 may be any programmable microprocessor, microcomputer or multiple processor chip or chips that can be configured by software instructions (applications) to perform a variety of functions, including the functions of the various embodiments described above. In some devices, multiple processors may be provided, such as one processor dedicated to wireless communication functions and one processor dedicated to running other applications. Typically, software applications may be stored in an internal memory before they are accessed and loaded into the processor 502. The processor 502 may include internal memory sufficient to store the application software instructions. In many devices the internal memory may be a volatile or nonvolatile memory, such as flash memory, or a mixture of both. For the purposes of this description, a general reference to memory refers to memory accessible by the processor 502 including internal memory or removable memory plugged into the mobile device and memory within the processor 502 itself.

FIG. 6 is a component block diagram of a mobile communication wireless device 600 suitable for implementing various embodiments. The mobile communication wireless device 600 may include a processor 601 coupled to a touchscreen controller 604 and an internal memory 602. The processor 601 may be one or more multi-core integrated circuits designated for general or specific processing tasks. The internal memory 602 may be volatile or non-volatile memory, and may also be secure and/or encrypted memory, or unsecure and/or unencrypted memory, or any combination thereof. The touchscreen controller 604 and the processor 601 may also be coupled to a touchscreen panel 66, such as a resistive-sensing touchscreen, capacitive-sensing touchscreen, infrared sensing touchscreen, etc. Additionally, the display of the mobile communication wireless device 600 need not have touch screen capability.

The mobile communication wireless device 600 may have two or more radio signal transceivers 608 (e.g., Peanut, Bluetooth, Zigbee, Wi-Fi, RF radio) and antennae 610, for sending and receiving communications, coupled to each other and/or to the processor 601. The transceivers 608 and antennae 610 may be used with the above-mentioned circuitry to implement the various wireless transmission protocol stacks and interfaces. The mobile communication wireless device 600 may include one or more cellular network wireless modem chip(s) 616 coupled to the processor and antennae 610 that enables communication via two or more cellular networks via two or more radio access technologies.

The mobile communication wireless device 600 may include a peripheral wireless device connection interface 618 coupled to the processor 601. The peripheral wireless device connection interface 618 may be singularly configured to accept one type of connection, or may be configured to accept various types of physical and communication connections, common or proprietary, such as USB, FireWire, Thunderbolt, or PCIe. The peripheral wireless device connection interface 618 may also be coupled to a similarly configured peripheral wireless device connection port (not shown).

The mobile communication wireless device 600 may also include speakers 614 for providing audio outputs. The mobile communication wireless device 600 may also include a housing 620, constructed of a plastic, metal, or a combination of materials, for containing all or some of the components discussed herein. The mobile communication wireless device 600 may include a power source 622 coupled to the processor 601, such as a disposable or rechargeable battery. The rechargeable battery may also be coupled to the peripheral wireless device connection port to receive a charging current from a source external to the mobile communication wireless device 600. The mobile communication wireless device 600 may also include a physical button 624 for receiving user inputs. The mobile communication wireless device 600 may also include a power button 626 for turning the mobile communication wireless device 600 on and off The processors 502 and 601 may be any programmable microprocessor, microcomputer or multiple processor chip or chips that can be configured by software instructions (applications) to perform a variety of functions, including the functions of various embodiments described below. In some mobile wireless devices, multiple processors 502 and 601 may be provided, such as one processor dedicated to wireless communication functions and one processor dedicated to running other applications. Typically, software applications may be stored in the internal memory 504, 506, and 604 before they are accessed and loaded into the processor 502 and 601. The processor 502 and 601 may include internal memory sufficient to store the application software instructions.

The foregoing method descriptions, process flow diagrams, and call flow diagrams are provided merely as illustrative examples and are not intended to require or imply that the blocks of various embodiments must be performed in the order presented. As will be appreciated by one of skill in the art the order of blocks in the foregoing embodiments may be performed in any order. Words such as "thereafter," "then," "next," etc. are not intended to limit the order of the blocks; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm blocks described in connection with the embodiments disclosed herein may be implemented as electronic hardware, computer software, or combinations of both. To clearly illustrate this interchangeability of hardware and software, various illustrative components, blocks, modules, circuits, and blocks have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the various aspects.

The hardware used to implement the various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic wireless device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of communication wireless devices, e.g., a combination of a DSP and a microprocessor, a plurality of microprocessors, one or more microprocessors in conjunction with a DSP core, or any other such configuration. Alternatively, some blocks or methods may be performed by circuitry that is specific to a given function.

In various embodiments, the functions described may be implemented in hardware, software, firmware, or any combination thereof. If implemented in software, the functions may be stored as one or more instructions or code on a non-transitory computer-readable medium or non-transitory processor-readable medium. The operations of a method or algorithm disclosed herein may be embodied in a processor-executable software module, which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable media may include RAM, ROM, EEPROM, FLASH memory, CD-ROM or other optical disk storage, magnetic disk storage or other magnetic storage wireless devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the various aspects. Various modifications to these embodiments will be readily apparent to those skilled in the art, and the generic principles defined herein may be applied to other embodiments without departing from the spirit or scope of the various aspects. Thus, the various aspects are not intended to be limited to the embodiments shown herein but is to be accorded the widest scope consistent with the following claims and the principles and novel features disclosed herein.

What is claimed is:

1. A method of allocating application functions to two or more mobile devices, comprising:
   determining, by a processor, whether a first motion of a first mobile device and a second motion of a second mobile device are correlated, within one of two or more correlation tiers by: and
   comparing the first and second motions to two or more threshold; and
   identifying a correlation tier within the one of the two or more correlation tiers based on the comparison of the first and second motions to the two or more thresholds; and
   allocating, by the processor, a first application function to the first mobile device and a second application function to the second mobile device in response to determining that the first motion and the second motion are correlated.

2. The method of claim 1, wherein the first application function and the second application function of an application running on one of the first and second mobile devices.

3. The method of claim 1, wherein the first application function and the second application function are functions of an application launched on one of the first and second mobile devices after determining that the first motion and the second motion are correlated.

4. The method of claim 1, wherein at least one of the first application function and the second application function is a latent application function.

5. The method of claim 1, wherein said determining whether the first motion of the first mobile device and the second motion of the second mobile device are correlated comprises determining whether the first motion and the second motion are correlated within a correlation threshold.

6. The method of claim 1, wherein said allocating the first application function to the first mobile device and the second application function to the second mobile device in response to determining that the first motion and the second motion are correlated comprises allocating the first application function and the second application function based on the identified correlation tier.

7. The method of claim 1, further comprising:
   determining, by the processor, whether the first motion of the first mobile device and the second motion of the second mobile device are no longer correlated; and
   performing, by the processor, one or more of:
   allocating both of the first and second application functions to one of the first mobile device and the second mobile device;
   terminating at least one of the first application function and the second application function; and
   launching an application on one or more of the first mobile device and the second mobile device in response to determining that the first motion and the second motion are no longer correlated.

8. The method of claim 1, wherein the first mobile device is a mobile communication device and the second mobile device is a wearable device.

9. The method of claim 8, wherein the wearable device is a smartwatch.

10. A method of allocating application functions among a first mobile device and a second mobile device, comprising:
    determining, by a processor, whether a first motion of the first mobile device held in a hand of the user and a second motion of the second mobile device worn on a wrist of the user are correlated within one of two or more correlation tiers by:
    comparing the first and second motions to two or more thresholds; and
    identifying a correlation tier within the one of the two or more correlation tiers based on the comparison of the first and second motions to the two or more thresholds; and
    allocating, by the processor, at least one application function of an application running on one of the first mobile device or the second mobile device to the other of the first mobile device or the second mobile device in response to determining that the first motion of the first mobile device held in the hand of the user and the second motion of the second mobile device worn on the wrist of the user are correlated.

11. The method of claim 10, wherein said allocating, by the processor, the at least one application function to at least one of the first mobile device held in the hand of the user or the second mobile device worn on the wrist of the user comprises allocating, by the processor, a first application function of the at least one application to the first mobile device held in the hand of the user and a second application function of the at least one application to the second mobile device worn on the wrist of the user.

12. The method of claim 10, wherein said allocating, by the processor, at least one application function to at least one of the first mobile device held in the hand of the user or the second mobile device worn on the wrist of the user comprises allocating, by the processor, a first application function of the at least one application to the first mobile device held in the hand of the user and a second application function of the at least one application to the second mobile device worn on the wrist of the user in response to determining based on a degree of correlation between the first motion and the second motion that the first mobile device is being held in the user's hand connected to the wrist on which the second mobile device is being worn.

13. A non-transitory processor-readable storage medium having stored thereon processor-executable software instructions configured to cause a processor to perform operations for allocating application functions to two or more mobile devices, comprising:
    determining, by a processor, whether a first motion of a first mobile device and a second motion of a second mobile device are correlated within one of two or more correlation tiers by:

comparing the first and second motions to two or more thresholds; and identifying a correlation tier within the one of the two or more correlation tiers based on the comparison of the first and second motions to the two or more thresholds; and allocating, by the processor, at least one of a first application function to the first mobile device and a second application function to the second mobile device in response to determining that the first motion and the second motion are correlated.

14. The non-transitory processor-readable storage medium of claim 13, wherein the stored processor-executable software instructions are configured to cause the processor to perform operations such that allocating at least one of the first application function to the first mobile device and the second application function to the second mobile device in response to determining that the first motion and the second motion are correlated comprises allocating the first application function and the second application function of an application running on one of the first and second mobile devices in response to determining that the first motion and the second motion are correlated.

15. The non-transitory processor-readable storage medium of claim 13, wherein the stored processor-executable software instructions are configured to cause a processor to perform operations such that at least one of the first application function and the second application function is a latent application function.

16. The non-transitory processor-readable storage medium of claim 13, wherein the stored processor-executable software instructions are configured to cause the processor to perform operations such that determining whether the first motion of the first mobile device and the second motion of the second mobile device are correlated comprises determining whether the first motion and the second motion are correlated within a correlation threshold.

* * * * *